United States Patent
Veal et al.

(10) Patent No.: US 8,282,113 B2
(45) Date of Patent: Oct. 9, 2012

(54) RIDEABLE LUGGAGE

(76) Inventors: James W. Veal, Pensacola, FL (US); Madelyn T. Veal, Pensacola, FL (US)

( * ) Notice: Subject to any disclaimer, the term of this patent is extended or adjusted under 35 U.S.C. 154(b) by 296 days.

(21) Appl. No.: 12/802,186

(22) Filed: Jun. 1, 2010

(65) Prior Publication Data
US 2011/0155527 A1 Jun. 30, 2011

Related U.S. Application Data

(60) Provisional application No. 61/217,505, filed on Jun. 1, 2009.

(51) Int. Cl.
*B62M 1/00* (2010.01)

(52) U.S. Cl. ......... 280/87.041; 280/87.021; 280/47.131; 280/47.24; 280/47.17; 280/43.1

(58) Field of Classification Search ............... 280/5.2, 280/5.24, 37, 43.1, 47.131, 47.17, 47.18, 280/47.21, 47.24, 47.26, 47.27, 47.315, 638, 280/639, 641–643, 651, 87.01, 87.021, 87.041
See application file for complete search history.

(56) References Cited

U.S. PATENT DOCUMENTS

| | | | | |
|---|---|---|---|---|
| 3,314,494 A * | 4/1967 | Weitzner | ................. | 180/208 |
| 3,413,011 A * | 11/1968 | Weitzner | ................. | 280/37 |
| 4,575,109 A * | 3/1986 | Cowdery | ................. | 280/37 |
| 4,913,252 A * | 4/1990 | Bartley et al. | ................. | 180/208 |
| 5,114,164 A * | 5/1992 | Bothwell et al. | ................. | 280/37 |
| 5,168,947 A * | 12/1992 | Rodenborn | ................. | 180/19.1 |
| 5,207,440 A * | 5/1993 | Liang | ................. | 280/47.11 |
| 6,273,442 B1 * | 8/2001 | Fallon et al. | ................. | 280/287 |
| 6,360,400 B1 * | 3/2002 | Chang | ................. | 16/113.1 |
| 6,460,866 B1 * | 10/2002 | Altschul et al. | ................. | 280/30 |
| 6,688,614 B2 * | 2/2004 | Hsu | ................. | 280/37 |
| 7,029,015 B2 * | 4/2006 | Lin | ................. | 280/47.26 |
| 7,077,229 B2 * | 7/2006 | Lee | ................. | 180/220 |
| 7,350,607 B2 * | 4/2008 | Park et al. | ................. | 180/65.51 |
| 7,431,311 B2 * | 10/2008 | Turner et al. | ................. | 280/30 |
| 7,438,302 B2 * | 10/2008 | Nichols | ................. | 280/87.041 |
| 7,461,715 B1 * | 12/2008 | Tsai | ................. | 180/208 |
| 7,503,439 B2 * | 3/2009 | O'Shea et al. | ................. | 190/18 A |
| 7,731,204 B2 * | 6/2010 | Turner et al. | ................. | 280/30 |
| 7,793,949 B2 * | 9/2010 | Wang | ................. | 280/37 |
| 7,793,970 B2 * | 9/2010 | Fegler et al. | ................. | 280/643 |
| 7,832,517 B2 * | 11/2010 | Tsai | ................. | 180/220 |
| 7,837,206 B1 * | 11/2010 | Lee | ................. | 280/37 |
| 2003/0042711 A1 * | 3/2003 | Hsu | ................. | 280/651 |
| 2004/0056442 A1 * | 3/2004 | Ostrowski et al. | ........ | 280/87.041 |
| 2004/0094919 A1 * | 5/2004 | Roder et al. | ................. | 280/30 |
| 2005/0156002 A1 * | 7/2005 | Neal et al. | ................. | 224/485 |
| 2009/0066045 A1 * | 3/2009 | Turner et al. | ................. | 280/30 |
| 2009/0295127 A1 * | 12/2009 | Wang | ................. | 280/639 |
| 2009/0315301 A1 * | 12/2009 | Athalye | ................. | 280/651 |
| 2010/0044174 A1 * | 2/2010 | Graf Von Bismarck | .... | 190/18 A |
| 2010/0147642 A1 * | 6/2010 | Andochick | ................. | 190/18 A |
| 2010/0175960 A1 * | 7/2010 | Moskowitz et al. | ........... | 190/11 |
| 2010/0213680 A1 * | 8/2010 | Massara et al. | ......... | 280/87.041 |

* cited by examiner

*Primary Examiner* — J. Allen Shriver, II
*Assistant Examiner* — Travis Coolman

(57) ABSTRACT

Rideable luggage that can be used as either a rolling suitcase or as a baggage scooter for carrying a rider, or additional baggage. The rideable luggage has a suitcase and a platform that can be selectively deployed for holding additional baggage or a person. The deployable platform has at least one scooter wheel at an outboard end and a pair of suitcase wheels at its inboard end. A center steer wheel is connected to an extendable handle to provide steering control. When the platform is deployed, the suitcase wheels retract so that only the steer wheel and scooter wheel are in contact with the floor. When the platform is retracted, the suitcase wheels extend and are in contact with the floor along with the steer wheel.

4 Claims, 8 Drawing Sheets

RIDEABLE LUGGAGE

CROSS REFERENCE TO RELATED APPLICATIONS

This application claims the benefit under 35 USC 119(e) of U.S. Provisional Patent Application 61/217,505 filed Jun. 1, 2009, and entitled "Rideable Luggage," the entire contents of which are hereby incorporated by reference.

TECHNICAL FIELD

The present invention relates to the field of transportation of persons and articles in luggage. Specifically, the present invention is a wheeled article carrier that can be converted into a rider operated scooter without compromising or effecting the article carrying capacity or operation of the luggage.

BACKGROUND OF THE INVENTION

Presently, many travelers use wheeled luggage to transport articles. Typically, this luggage has a telescoping handle that is positioned on the opposite end of the luggage from a pair of wheels. A user extends the handle and then rolls the luggage on its wheels. However, in many airports travelers are required to traverse long distances to reach connecting flights or to enter/exit the airport facility. Even with wheeled luggage, pulling this luggage over long distances is awkward and can become quite tiring to the traveler who is required to walk the entire distance in an often uncomfortable and anatomically strained position. Moreover, wheeled luggage typically does not respond well to turning commands and is otherwise sluggish in its handling and response to operator inputs.

Thus, there is a need for a device that efficiently carry articles (serves as luggage) while also providing a more efficient means for moving persons the long distances that must often be traversed in modern airports.

SUMMARY OF THE INVENTION

The present invention provides an integration of a standard suitcase with a wheeled transportation device for persons. This integration creates rideable luggage that allows a user to easily cover large distances with less effort than walking a comparable distance, while also providing improved maneuverability of the luggage itself.

In suitcase only mode, the present invention closely resembles well known rolling luggage, with a pair of suitcase wheels at the lower, outboard corners of the luggage, and a retractable handle positioned at the upper end of the luggage. In this mode, a user simply extends the handle, and pulls the luggage which rolls on the pair of suitcase wheels.

To convert the luggage into rideable mode, a hinged platform is released. This platform is hinged near the bottom of the luggage and folds flat against, and is secured to, the rear side of the luggage when it is not deployed. The platform includes, at one end, a pair of scooter wheels located on the outboard corners of the platform, and, at the other end, the pair of suitcase wheels previously discussed. The hinge is intermediate between these two sets of wheels, and in one embodiment, is positioned just inboard of the suitcase wheels. The hinge defines a pivot point about which the platform rotates. Because of the geometry of the hinge, platform, and suitcase wheels, deploying the platform causes the suitcase wheels to rotate upward, into a cavity in the suitcase.

The retractable handle extends through the suitcase and attaches to a single steer wheel located in the bottom of the suitcase. This steer wheel is positioned such that it is not in contact with the ground when the platform is not deployed. Deploying the platform, however, causes the suitcase wheels to rotate upward, thereby putting the steer wheel in contact with the ground. The retractable handle also is capable of arcuate articulation, whereby the direction of the steer wheel can be changed to steer the rideable luggage when in rideable mode.

In an alternative embodiment, an electric motor and battery pack are included, and housed in the suitcase, and are used to provide motive force directly to the steer wheel.

DESCRIPTION OF THE PREFERRED EMBODIMENTS

The following detailed description, which references and incorporates the Figures, describes and illustrates one or more specific embodiments of the invention. These embodiments are offered not to limit but only to exemplify and teach the invention, and are shown and described in sufficient detail to enable those skilled in the art to practice the invention. Thus, where appropriate to avoid obscuring the invention, the description may omit certain information known to those skilled in the art.

Figure 1:
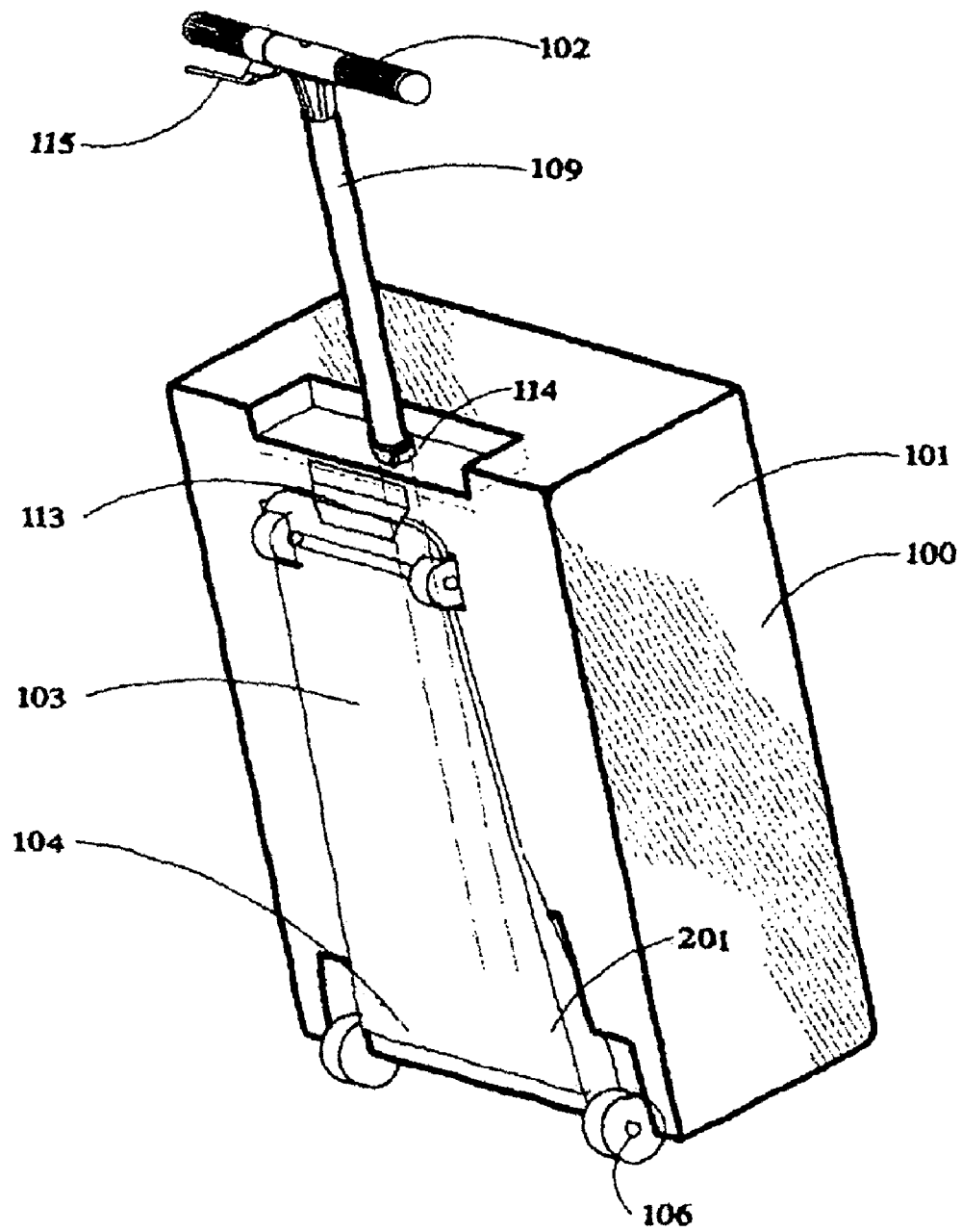
FIG. 1 is an isometric view of an embodiment of the rideable luggage of the present invention with the platform stowed.
Figure 1A:
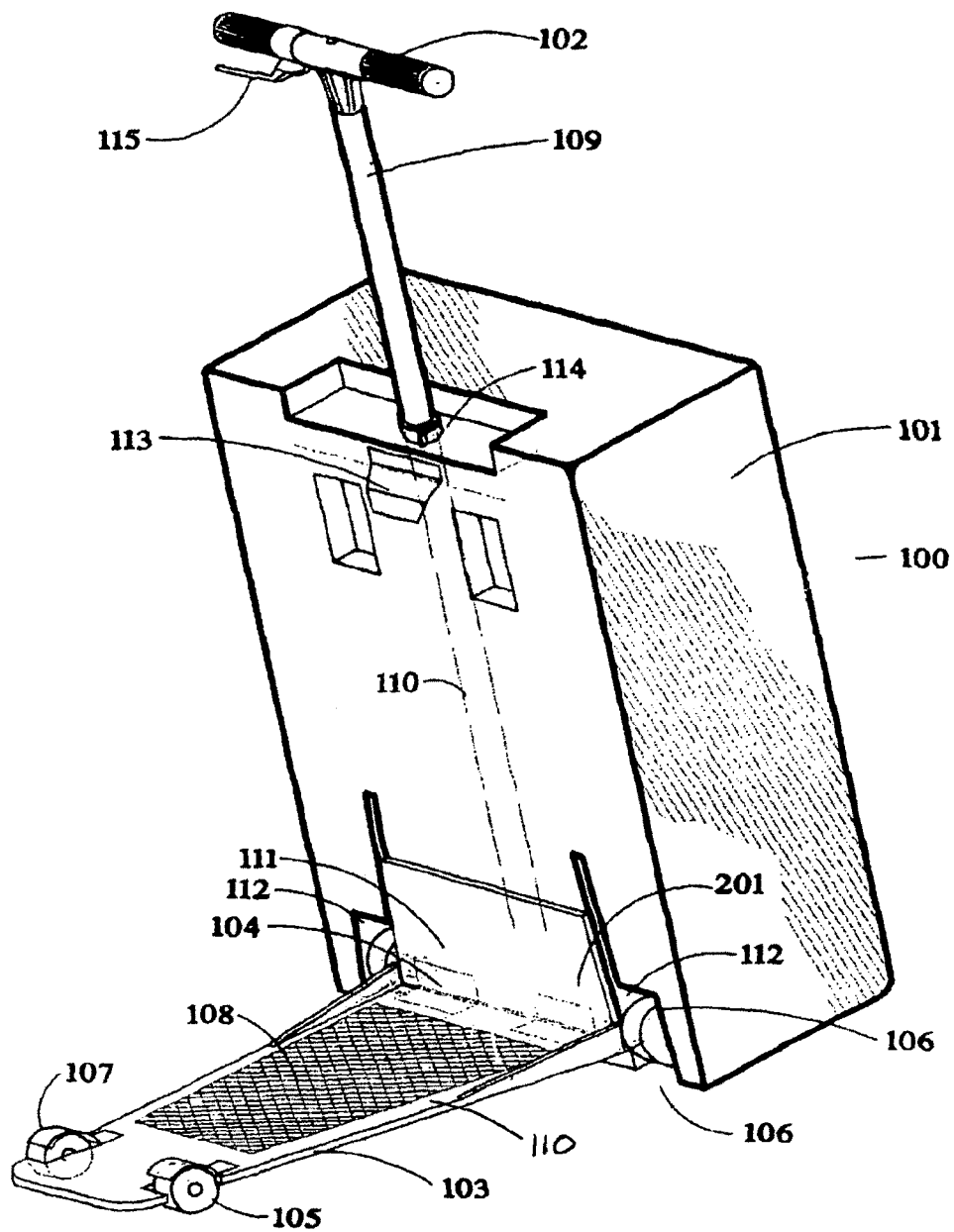
FIG. 1A is an isometric view of an embodiment of the rideable luggage of the present invention with the platform deployed.

Referring to FIG. 1A, rideable luggage 100 includes suitcase 101, a deployable platform 103, and a handle 102. Suitcase 101 is preferably sized to meet most airlines requirements for carry-on luggage. Alternatively, suitcase 101 may also be larger than the size allowed for carry-on luggage. Suitcase 101 may be constructed from fabric, leather, plastic, metal, or any other suitable material. Handle 102 is attached to telescoping shaft 109. Handle 102 is shown in its deployed position, wherein telescoping shaft 109 is fully extended and handle 102 is remote from suitcase 101. Optionally, handle 102 includes throttle 115. Platform 103 is shown in its deployed position. Platform 103 includes stand surface 110, which is covered by non-slip pad 108. Platform 103 may be constructed from metal, plastic, or any other sufficiently rigid and strong material. At its outboard end, platform 103 includes a pair of scooter wheels 105, which, preferably, are recessed into platform 103 and are formed from a low-friction material to reduce rolling resistance. Brakes 107 are formed from metal or hard plastic and attached to platform 103 inboard of scooter wheels 105 then cantilever over scooter wheels 105. At its inboard end, platform 103 includes a pair of suitcase wheels 106 which are external to platform 103, and also are formed from a low-friction material. Suitcase wheels 106 are recessed into suitcase 101. Platform 103 is attached to suitcase 101 by hinge 104. Hinge 104 may be a single hinge, or multiple hinges. Preferably, hinge 104 is spring loaded (biasing the platform into the retracted position) and limits the rotation about the axis created by hinge 104 to approximately 95 degrees. Hinge 104 connects between platform 103 and back plate 111. Back plate 111 is fixedly connected to the rear side of suitcase 101 between suitcase wheels 106. Clasp 113 is connected to the back of suitcase 101.

Referring to FIG. 1, an isometric view of rideable luggage 100, with platform 103 in the stowed or retracted position, is shown. Platform 103 is secured to the back of suitcase 101 by clasp 113.

Figure 2:
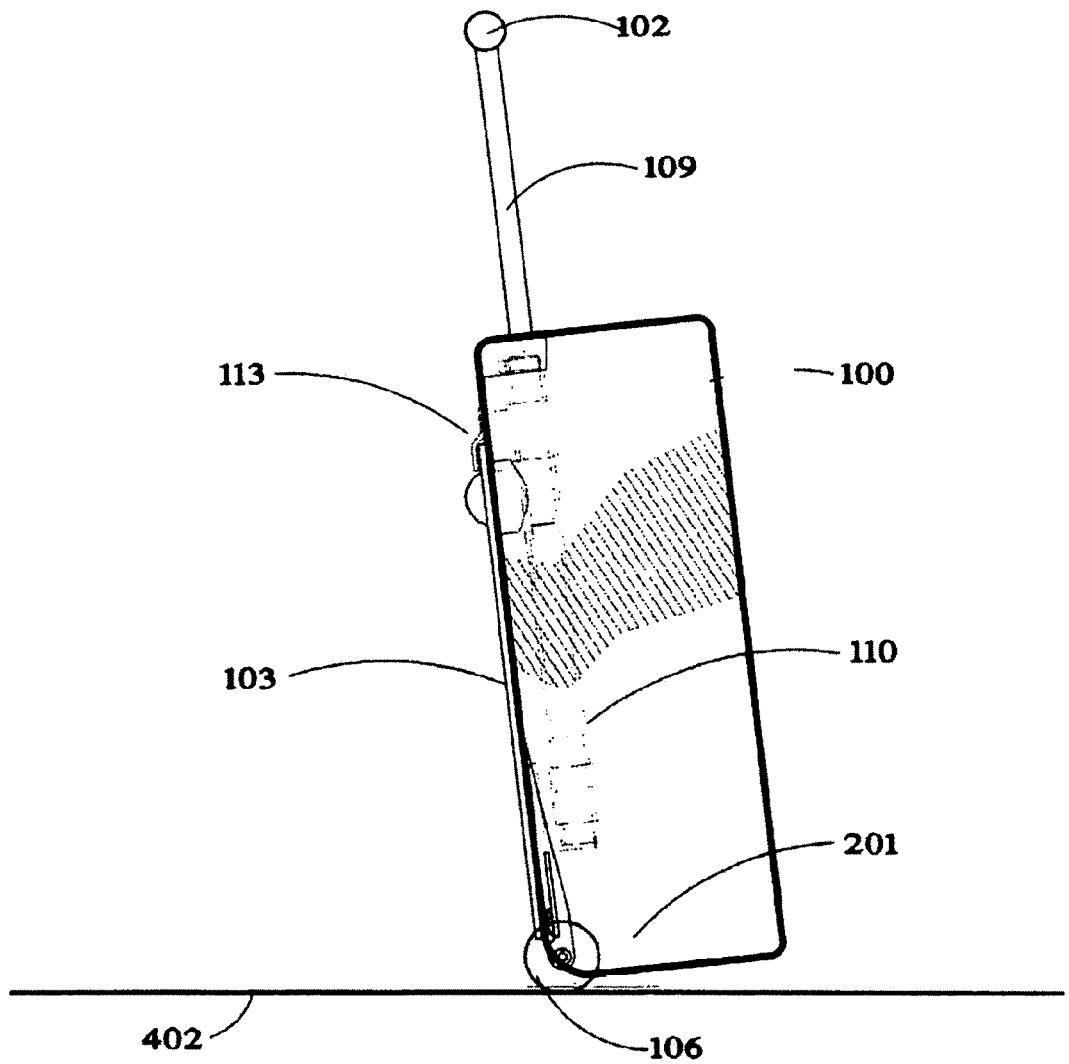
FIG. 2 is a side view of an embodiment of the rideable luggage of the present invention.
Figure 4:
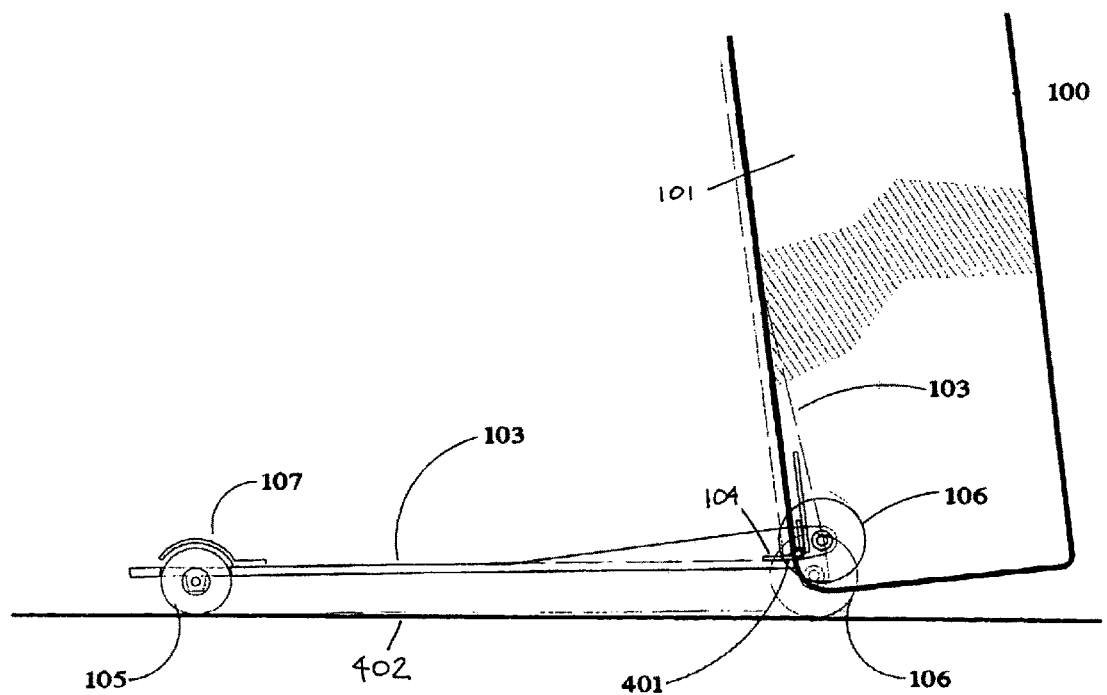
FIG. 4 is a side view of an embodiment of the rideable luggage of the present invention.
Figure 5:
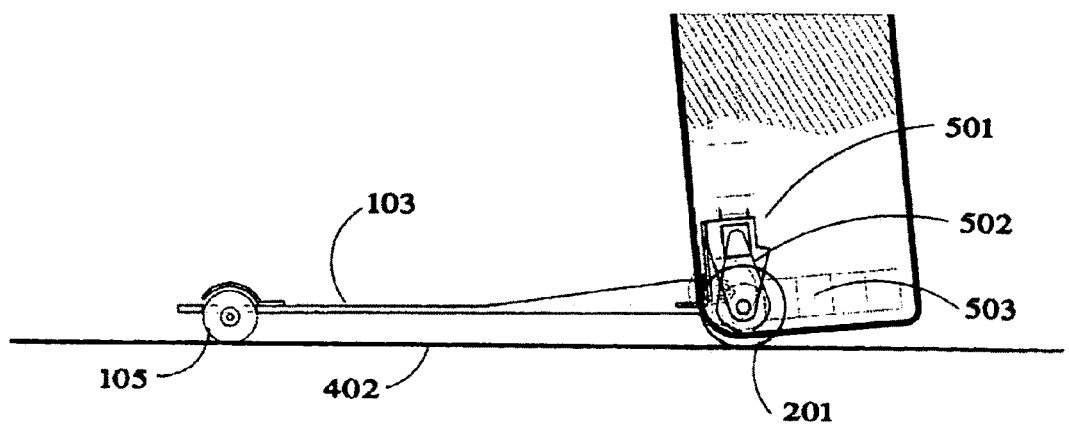
FIG. 5 is a side view of an embodiment of the rideable luggage of the present invention.

Referring to FIG. 4, a side view of rideable luggage 100 is shown. In this view, platform 103 is shown in the deployed position. The axis of rotation of hinge 104 creates pivot point 401. With platform 103 in the deployed position, suitcase wheel 106 is not in contact with floor 402; rather, suitcase wheel 106 is retracted into suitcase FIG. 5 is a side view of an embodiment of the rideable luggage of the present invention 101. When platform 103 is retracted, the rotation of platform 103 about pivot point 401 causes wheel 106 to be positioned in contact with floor 402 (as shown in dotted line). Referring to FIG. 2, rideable luggage 100 is shown in suitcase mode, with platform 103 retracted and retained by clasp 113, and with wheel 106 in contact with floor 402.

Figure 3:
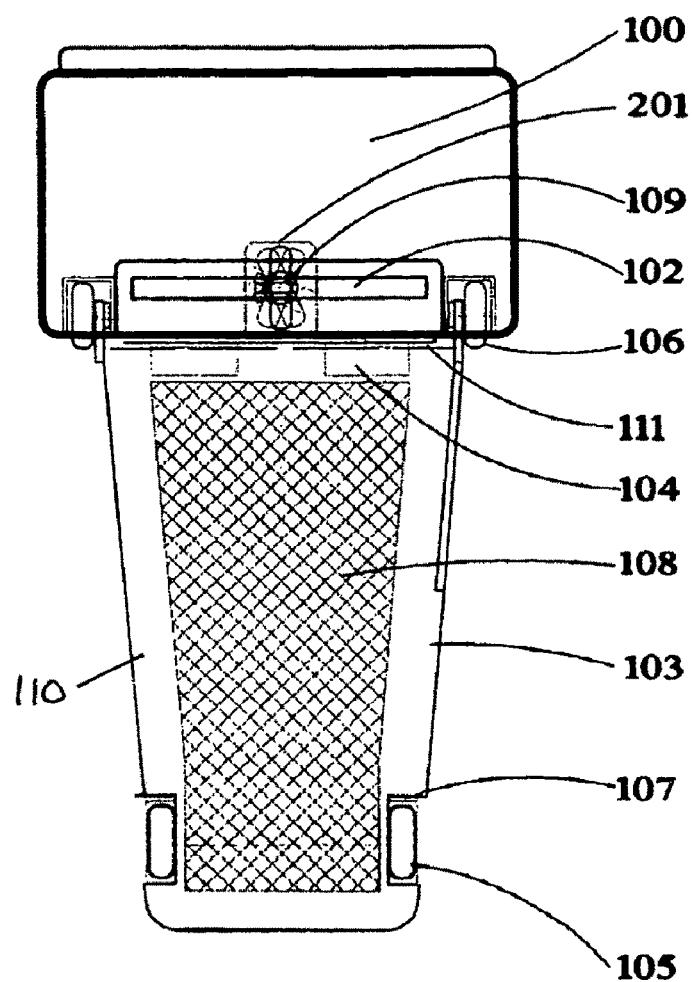
FIG. 3 is a top view of an embodiment of the rideable luggage of the present invention.

Referring to FIG. 3, a top view of rideable luggage 100 is shown. Steer wheel 201 is positioned intermediate between suitcase wheels 106. As shown in FIGS. 1, 1A, and 4, due to the geometry created by hinge 104 and pivot point 401, deploying platform 103 causes suitcase wheels 106 to rotate upward in cavity 112, and to lose contact with floor 402. When platform 103 is in the retracted position, suitcase wheels 106 contact floor 402. Thus, when rideable luggage 100 is in luggage only mode, rideable luggage 100 has three wheels (two suitcase wheels 106 and one steer wheel 201) in contact with floor 402. When rideable luggage 100 is in scooter or riding mode, rideable luggage 100 again has three wheels in contact with floor 402; however, in this configuration, the three wheels are two scooter wheels 105 and steer wheel 201.

Figure 2A:
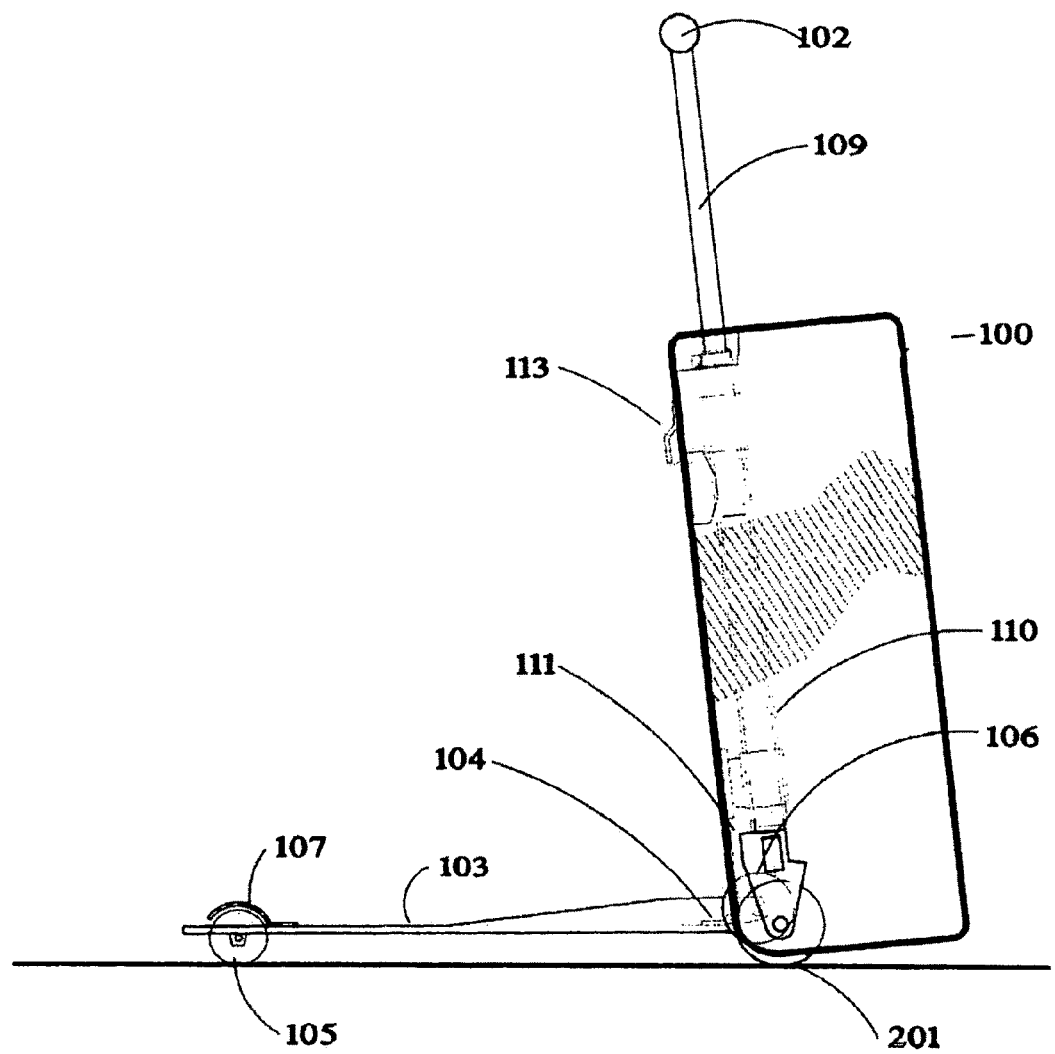
FIG. 2A is a side view of an embodiment of the rideable luggage of the present invention with the platform deployed.

Referring to FIG. 2 and FIG. 2A, handle 102 connects to extendable shaft 109. Extendable shaft 109 extends through suitcase 101 and connects to steer wheel 201. Handle 102 is capable of arcuate rotation. Because there is a direct connection (through extendable shaft 109) to steer wheel 201, rotation of handle 102 also causes steer wheel 201 to rotate. Further, because deployment of platform 103 causes suitcase wheels 106 to move above floor 402, steer wheel 201, as the only wheel in contact with floor 402, provides directional control and allows for rideable luggage 100 to be highly maneuverable.

Referring to FIG. 5, an alternate embodiment, including an electric motor assist, is shown. In this embodiment, battery 503, drive belt 502, and motor 501 are located within the bottom of suitcase 101 and in proximity to steer wheel 201. Throttle 115 (not shown) is used to control the speed of motor 501. Motor 501 is electrically connected to battery 503 and is mechanically connected to steer wheel 201 through drive belt 502.

Figure 6:
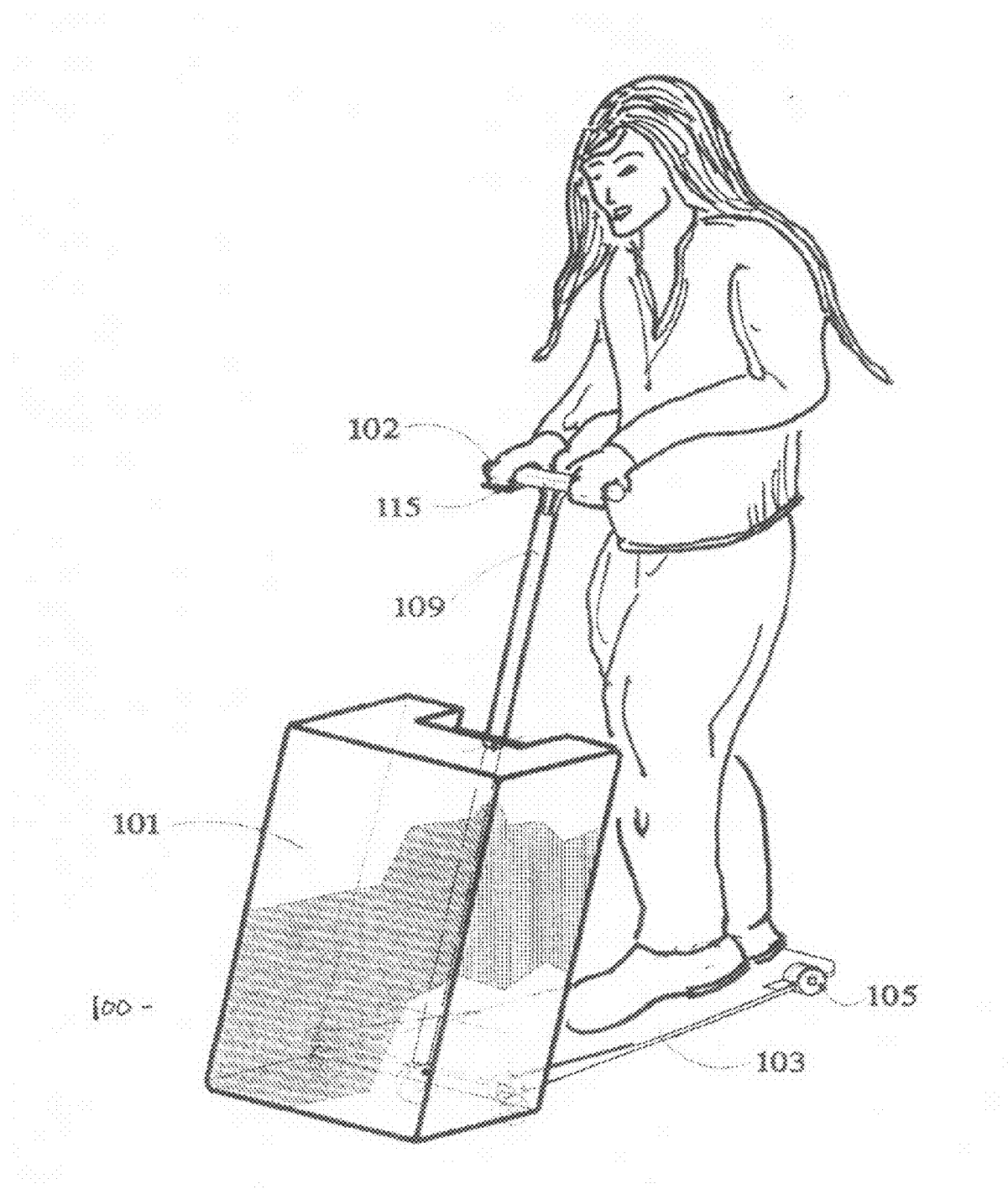
FIG. 6 is an isometric view of an embodiment of the rideable luggage of the present invention in use by a user.

Referring to FIG. 6, rideable luggage 100 is shown in use. A user stands on platform 103 and grasps handle 102. The rideable luggage may be propelled by the user in skateboard fashion, or by using the throttle 115 to control the electric assist.

We claim:

1. Rideable luggage comprising:
   a. a suitcase;
   b. a riding platform, said platform having at least one scooter wheel positioned at a first end of said platform, and a pair of suitcase wheels positioned at a second end of said platform;
   c. a hinge, said hinge attached to said suitcase and attached to said platform between said at least one scooter wheel and said suitcase wheels wherein said hinge defines a pivot point about which said platform rotates;
   d. said platform having a first position, wherein said platform first end is secured to a back of said suitcase and said suitcase wheels are in contact with a floor;
   e. said platform having a second position, wherein said platform rotates about said pivot point so that said platform first end is remote from said suitcase back, said at least one scooter wheel is in contact with said floor, and said suitcase wheels are not in contact with said floor;
   f. a handle, said handle operably connected to an extendable steer shaft, wherein said handle, when in a retracted position, is positioned at a top of said suitcase and said handle, when in an extended positioned, is positioned above said top of said suitcase;
   g. a steer wheel, said steer wheel connected to said extendable steer shaft and positioned intermediate to said suitcase wheels, whereby rotation of said handle causes rotation of said steer wheel.

2. The rideable luggage of claim 1 further including an electric motor operably connected to said steer wheel.

3. The rideable luggage of claim 2 further including a throttle, operably connected to said electric motor, wherein said throttle is connected to said handle.

4. Rideable luggage comprising:
   a. a suitcase;
   b. a hinge attaching a deployable platform to said suitcase;
   c. a pair of suitcase wheels attached to said platform, said suitcase wheels having a first position when said platform is deployed and a second position when said platform is not deployed;
   d. a pair of scooter wheels attached to said platform opposite said suitcase wheels; and
   e. a handle, said handle connected through an extendable shaft to a steer wheel;
   wherein, when said platform is deployed only said scooter wheels and said steer wheel are in contact with a floor.

* * * * *